UNITED STATES PATENT OFFICE.

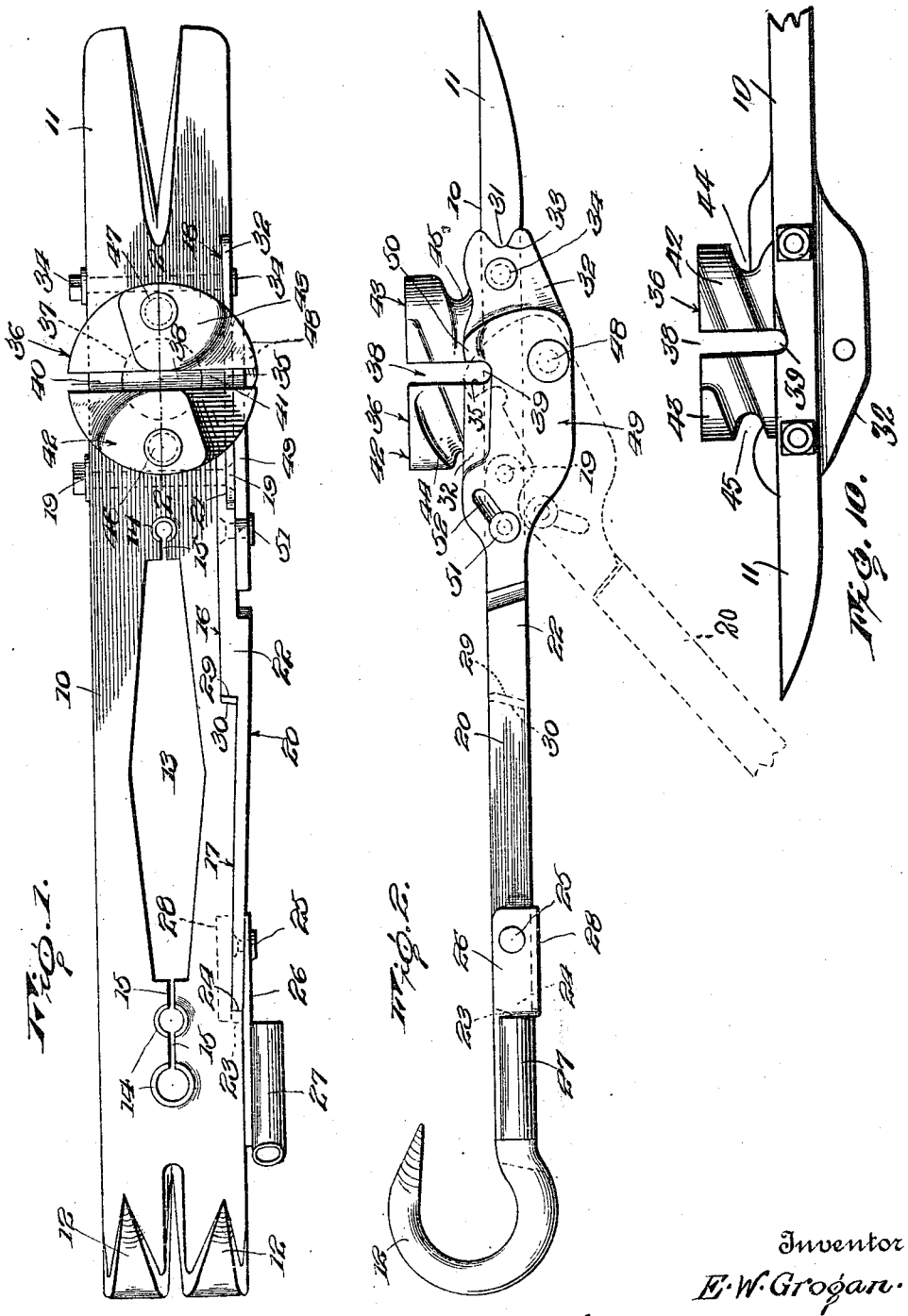

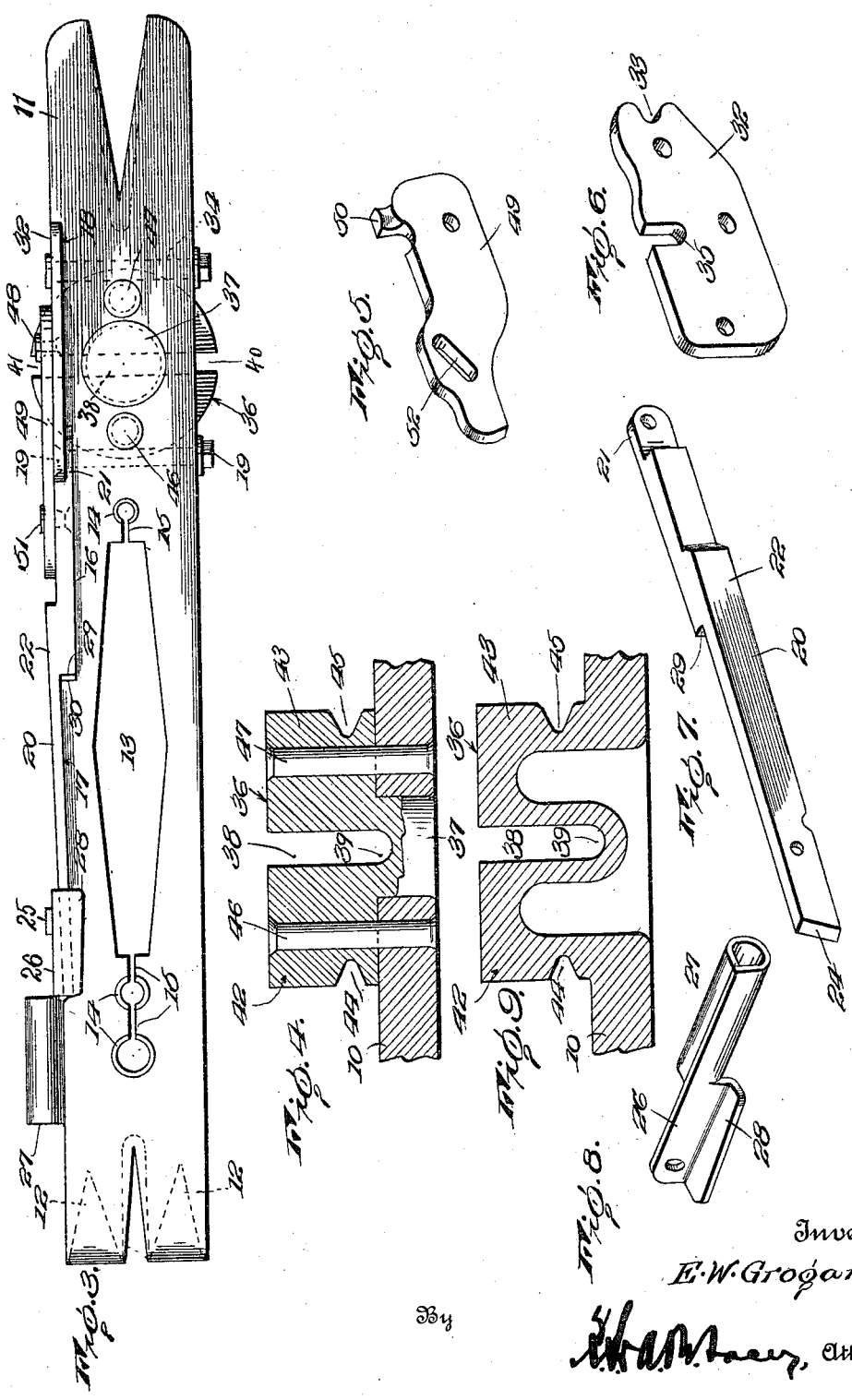

EDWARD W. GROGAN, OF BYERS, TEXAS.

COMBINATION FENCE AND REPAIR TOOL.

1,272,658.

Specification of Letters Patent.

Patented July 16, 1918.

Application filed September 6, 1917. Serial No. 190,068.

*To all whom it may concern:*

Be it known that I, EDWARD W. GROGAN, a citizen of the United States, residing at Byers, in the county of Clay and State of Texas, have invented certain new and useful Improvements in Combination Fence and Repair Tools, of which the following is a specification.

This invention relates to combination implements, more particularly to the class of implements of this character adapted to manipulate the wires in building and repairing wire fences, and has for one of its objects to simplify the construction and increase the efficiency and utility of devices of this character.

Another object of the invention is to provide a device of this character whereby strand wires of wire fences may be tightened either when erecting the fence or taking up slack in the strand wires.

Another object of the invention is to provide a device combining twisting and severing operations coacting to produce the desired result.

With these and other objects in view, the invention consists in certain novel features of construction, as hereinafter shown and described and then specifically pointed out in the claims; and in the drawings illustrative of the preferred embodiment of the invention—

Figure 1 is a top plan view of the improved implement;

Fig. 2 is a side elevation;

Fig. 3 is a bottom plan view;

Fig. 4 is an enlarged section on the line 2—2 of Fig. 1;

Fig. 5 is a detached perspective view of the movable wire severing member;

Fig. 6 is a detached perspective view of the combined supporting plate and stationary wire severing member;

Fig. 7 is a detached perspective view of the operating lever of the wire severing device;

Fig. 8 is a detached perspective view of the wire guide attachment of the actuating lever;

Fig. 9 is a view similar to Fig. 4 illustrating a modification in the construction; and Fig. 10 is a view of the head portion of the improved implement from the side opposite to that shown in Fig. 2.

Corresponding and like parts are referred to in the following description and indicated in all the views of the drawings by the same reference characters.

The improved device comprises a main stock or handle portion, represented as a whole at 10, and having a nail-pulling claw 11 at one end and staple-pulling hooks 12 at the opposite end. The stock member 10 is provided intermediate the ends with a longitudinally directed slot, represented as a whole at 13, extending entirely through the stock and converging in width toward the ends, as shown in Fig. 1. The slot 13 serves as a nut-engaging feature, and enables the stock 10 to be employed as a wrench, the converging form of the slot enabling nuts of varying sizes to be engaged. Formed through the stock at intervals are threaded apertures 14 of varying sizes, the apertures being connected to the slot 13 at its ends by clefts 15 communicating with the threaded apertures at one side. The apertures 14 are designed to engage over bolts of various sizes to enable the threads to be cleared of obstructions. After long exposure to the elements the threaded portions of the bolts are liable to become clogged from oxidation and likewise liable to become clogged by painting or from accumulations of grit and other foreign matter, and frequently render it almost impossible to remove the nuts. By employing the apertures 14 having the clefts 15 obstructions of this character may be readily removed from bolts, prior to the releasing of the nuts, or to relieve the bolts from obstructions prior to the application of the nuts thereto.

Formed in one edge of the stock 10 is a longitudinally directed recess including a relatively deep intermediate portion 16 and relatively shallow portions 17 and 18 of less depth than the portion 16. Pivoted at 19 to the stock 10 within the portion 16 of the recess is an operating lever arm, represented as a whole at 20. The structure of the lever is shown more clearly in Fig. 7, and is reduced at one end, as shown at 21, to engage the pivot and increased in thickness, as represented at 22, to stiffen and strengthen the lever. The terminal of the portion 17 of the recess is inclined and undercut, as represented at 23, while the free end of the portion 20 of the lever is correspondingly beveled, as shown at 24, to seat against the portion 23 of the stock when closed or disposed in parallel relation to the stock, as shown in Fig. 2. By this means the lever is prevented from moving beyond a point in parallel relation to the stock in one direction, but is free to be rotated upon its pivot 19 in the opposite direction as indicated by dotted lines in Fig. 2. Pivoted at 25 to the free end of the lever arm is a plate 26 having a portion rolled into a finger grip 27 and with another portion directed laterally as shown at 28 to bear under the adjacent edge of the member 10. At one end the thickened portion 22 of the lever is formed with a shoulder 29 which bears against a corresponding shoulder 30 at the adjacent end of the portion 16 of the recess, the two portions 29 and 30 co-acting to form a stop to prevent the movement of the lever in one direction. The stop portions 23 and 24 and the stop portions 29 and 30 provide for a two-fold check to the movement of the lever.

The end of the portion 18 of the longitudinally directed recess next to the claw member 11 is in V-shape, as shown at 31, and bearing within the portion 18 of the longitudinally directed recess is a bearing plate, represented as a whole at 32, and shown detached in perspective in Fig. 6. The member 32 is provided with a V-shaped recess or cavity 33 which engages the V-shaped portion 31 of the stock. The member 32 is rigidly connected at one end to the stock 10 by a rivet or like fastening device 34, while the pivot 19 is riveted or otherwise secured at its outer end in the member 32. The pivot 19 thus performs a two-fold function of a holding device for the member 32 and as a pivot for the lever arm 20. The member 32 is likewise provided with a wire receiving recess 35 which registers with the recess 41 and forms a continuation of the same.

The member 32 is of greater width than the thickness of the stock 10 and projects beyond the opposite wider faces of the same, as shown in Fig. 2.

Mounted upon the stock 10 is a wire twisting device comprising a head member, represented as a whole at 36 and provided with a relatively large stud 37 which extends through a cavity in the stock 10 and is riveted or otherwise secured therein, as shown in Fig. 4. The member 36 is provided with a wire receiving channel 38 which extends at its inner end into the stud portion 37, as shown at 39, the bottom of the channel coming below the adjacent face of the stock 10. The portions of the stock 10 opposite the terminals of the channel 38 are cut out, as shown at 40 and 41, the three portions 39, 40 and 41 being in alinement transversely of the stock. The head member 36 is thus divided by the channel 40—41 into two semi-circular portions 42 and 43, as illustrated in Figs. 1 and 2. The portion 42 of the wire twisting device is provided with a semi-circular wire receiving channel 44, while the portion 43 is provided with a similar semi-circular channel 45, the channels being directed obliquely to the transverse plane of the member 36 or in screw-like or spiral form. The spiral channel or groove 44 of the portion 42 merges into the spiral channel or groove 45 of the portion 43. By this means when the channel 38 is disposed over a wire, or a plurality of wires, and a rotary movement applied to the stock 10, the wire or wires will be twisted and enter the channels 44 and 45 and thus wound around a common center, and this will not only effectually shorten the wire but apply strong pulling strain thereto. The strand wires or main longitudinal wires of a fence may thus be effectually stretched or strained either in building new fences, or in tightening fences which have become loosened from any cause.

The portions 42 and 43 of the wire twisting portion of the device are preferably further secured and supported by rivets or like fastening devices 46 and 47. The coacting fastening devices 37, 46 and 47 firmly secure the wire twisting element to the stock and prevent its displacement under the severe strains to which it will be subjected when in use, especially when twisting two or more wires, or the heavier grade of barbed wire or similar material.

Pivoted at 48 to the member 32 is a plate 49 having a wire severing projection 50 which is adapted to pass transversely of the inner portion of the wire-receiving recess or channel 40—41. By this means it will be obvious that when the member 49 is moved upon its pivot 48 the projecting portion 50 will be moved over the lower inner end of the wire-receiving channel 41, and will thus operate as a cutter to sever the wire held in the coacting channels. Means are provided for actuating the member 49 by the movement of the lever 20, and this movement is accomplished by the coaction of a pivot or pin 51 carried by the member 20 and extending through a slot 52 in the member 49, the slot being disposed obliquely to the longitudinal plane of the member 49, as shown in Figs. 2 and 5. By this simple arrangement when the lever 20 is moved into a position oblique to the longitudinal axis of the stock, a strong leverage action is produced upon the member 49 to cause the severing portion 50 to coöperate with the channel 41 and sever a wire disposed therein. This movement of the lever disposes the member 49 into the position shown by dotted lines in Fig. 2. The shearing action thus coöperates with the wire-twisting action, and enables the operator to sever the wire in close proximity to the twist when required.

If preferred the twisting member 36 may be cast or otherwise formed integral with the stock 10, as shown in Fig. 9, and when thus constructed the head will preferably be hollow to decrease the weight.

The member 36 may be utilized as a hammer head, to drive nails or staples.

When the wire is twisted until it is sufficiently tight, it may be severed at one side of the groove leaving a loose end of sufficient length to enable the wire to be spliced by turning the loose end back and winding it around the main or straight portion of the wire and then turning the improved implement over and completing the splice by winding the other end around the wire.

By this means a neat and substantial splice is formed which is relatively stronger than the body of the wire.

Having thus described the invention, what is claimed as new is:

1. An implement of the class described, comprising a stock having a wire-twisting head extending therefrom, said head having a transverse wire-receiving channel and with segmental spiral grooves in its outer face at opposite sides of the channel and extending obliquely to the axis of the head and merging respectively into the outer end and the side faces of the same and communicating with the channel.

2. An implement of the class described, comprising a stock having a wire-twisting head extending therefrom, said head having a transverse wire-receiving channel and with segmental spiral grooves in its outer face at opposite sides of the channel and extending obliquely to the axis of the head and merging respectively into the outer end and the side faces of the same and communicating with the channel, and a wire-severing device carried by the stock and operating transversely of the channel.

In testimony whereof I affix my signature.

EDWARD W. GROGAN. [L. S.]

Copies of this patent may be obtained for five cents each, by addressing the "Commissioner of Patents, Washington, D. C."